(12) United States Patent
Friedlander et al.

(10) Patent No.: US 10,341,711 B2
(45) Date of Patent: Jul. 2, 2019

(54) REMOTE CONTROLLER DEVICE WITH ELECTRONIC PROGRAMMING GUIDE AND VIDEO DISPLAY

(75) Inventors: Steven Friedlander, San Diego, CA (US); Jeffrey D. Moguillansky, San Diego, CA (US)

(73) Assignee: Saturn Licensing LLC, New York, NY (US)

( * ) Notice: Subject to any disclaimer, the term of this patent is extended or adjusted under 35 U.S.C. 154(b) by 730 days.

(21) Appl. No.: 13/096,205

(22) Filed: Apr. 28, 2011

(65) Prior Publication Data
US 2012/0117600 A1  May 10, 2012

Related U.S. Application Data

(60) Provisional application No. 61/412,016, filed on Nov. 10, 2010.

(51) Int. Cl.
*H04N 21/422* (2011.01)
*H04N 21/482* (2011.01)
(Continued)

(52) U.S. Cl.
CPC ... *H04N 21/42208* (2013.01); *H04N 21/4126* (2013.01); *H04N 21/42204* (2013.01); *H04N 21/43615* (2013.01)

(58) Field of Classification Search
CPC ......... H04N 21/4126; H04N 21/42204; H04N 2005/4425; H04N 2005/4423;
(Continued)

(56) References Cited

U.S. PATENT DOCUMENTS 5,818,439 A * 10/1998 Nagasaka et al. ............... 725/87
8,150,387 B2 * 4/2012 Klein et al. .................... 455/420
(Continued)

FOREIGN PATENT DOCUMENTS

| CN | 0101072309 A | 11/2007 |
|---|---|---|
| CN | 0101155254 A | 4/2008 |
| CN | 0101192338 A | 6/2008 |

OTHER PUBLICATIONS

Dish Network, Dish Network Vip 622 High-Definition MPEG4 Dual Output HDTV Satellite Receiver/Recorder/Tuner (Vip-622), web page, downloaded Mar. 23, 2011, http://www.solidsignal.com/ (3 pgs.).
(Continued)

*Primary Examiner* — Ricky Chin
(74) *Attorney, Agent, or Firm* — Fitch, Even, Tabin & Flannery LLP

(57) ABSTRACT

A remote controller device, according to one embodiment, includes a display screen on which can be displayed a first item of video content as well as video content programming information. The first item of video content is displayed on the remote controller display screen and corresponds to the same video content that simultaneously is being displayed on a screen of a TV that can be controlled by the remote controller device. In response to a user command for selecting a program or video that currently is not being shown on the TV, a second item of video content is displayed on the remote controller display screen while the TV continues to show the first item of video content. In response to another user command, the remote controller device causes the TV to change channels (or otherwise change its reception to another content source) and display the second item of video content.

25 Claims, 4 Drawing Sheets

(51) Int. Cl.
*H04N 21/41* (2011.01)
*H04N 21/436* (2011.01)

(58) Field of Classification Search
CPC ......... H04N 21/4227; H04N 21/42219; H04N 21/4222; H04N 21/4224; H04N 21/482
USPC ..... 725/37–43, 62, 74, 80, 81, 85, 133, 141, 725/153
See application file for complete search history.

(56) References Cited

U.S. PATENT DOCUMENTS

| | | | |
|---|---|---|---|
| 8,479,230 B2* | 7/2013 | Walter ............... | H04N 7/17318 725/37 |
| 2004/0210933 A1* | 10/2004 | Dresti ................ | G08C 17/00 725/40 |
| 2007/0290876 A1* | 12/2007 | Sato et al. ............... | 340/825.22 |
| 2008/0046925 A1* | 2/2008 | Lee et al. ................. | 725/37 |
| 2008/0127262 A1* | 5/2008 | Neufeld et al. ............ | 725/40 |
| 2008/0134256 A1* | 6/2008 | DaCosta ............ | H04N 7/17318 725/62 |
| 2008/0168514 A1 | 7/2008 | Jeon | |
| 2008/0239160 A1 | 10/2008 | Ho | |
| 2009/0233593 A1 | 9/2009 | Ergen | |
| 2009/0241151 A1 | 9/2009 | Frank | |
| 2009/0298535 A1 | 12/2009 | Klein et al. | |
| 2010/0071007 A1 | 3/2010 | Meijer | |
| 2010/0218214 A1 | 8/2010 | Fan | |
| 2010/0229196 A1 | 9/2010 | Lee | |
| 2010/0328547 A1 | 12/2010 | Mayorga | |
| 2011/0069178 A1* | 3/2011 | Harris ............... | 348/181 |
| 2011/0167447 A1* | 7/2011 | Wong ............... | H04N 21/42208 725/40 |
| 2011/0219419 A1* | 9/2011 | Reisman ............... | 725/112 |

OTHER PUBLICATIONS

Hauppauge!, WinTV Extend Overview; web page, downloaded Feb. 24, 2011, http://www.hauppauge.com (1 pg.).
PEEL—The App; web page, downloaded Mar. 17, 2011, http://www.peel.com/peel-app.php (10 pgs.).
Donald Bell; CNET News; CES: Peel Universal iPhone Remote Puts Discovery First, article, Dec. 8, 2010, http://news.cnet.com (3 pgs.).
Apple, Time Warner Video on iPad, web page, downloaded Mar. 17, 2011, http://itunes.apple.com/us/app/twcable-tv/id420455839?mt=8 (1 pgs.).
Dish Network, TV Everywhere Remote Access, web page, downloaded Feb. 28, 2011, http://www.dishnetwork.com/tveverywhere/remoteaccess (3 pgs.).
First Office Action for Application No. 201110317375.7 mailed from the State Intellectual Property Office of the People's Republic of China dated Nov. 15, 2013.
Translation of Notification of the Second Office Action for Chinese Patent Application No. 201110317375.7 mailed from the State Intellectual Property Office of the People's Republic of China dated Apr. 6, 2014.

* cited by examiner

REMOTE CONTROLLER DEVICE WITH ELECTRONIC PROGRAMMING GUIDE AND VIDEO DISPLAY

CROSS REFERENCE TO RELATED APPLICATIONS

This application claims benefit of U.S. Provisional Application No. 61/412,016, filed Nov. 10, 2010, which such application is incorporated herein by reference as if fully set forth herein.

1. Field of Invention

This relates to a remote controller having a display screen, and a method of operating a remote controller.

2. Background

Although the television ("TV") has evolved substantially over time from CRT TVs to LCD TVs, Plasma TVs, LCD+LED TVs and OLED TVs, the functions performed by remote controller devices for TVs have not evolved substantially. For the most part remote controller devices generally have maintained virtually the same functions, i.e., a series of input buttons for channel selection and volume control. Most recently, the TV has evolved into a network-connected device capable of delivering (playing and/or displaying) a vast array of audio, image, video, audio/image and audio/video content (i.e., content) from a variety of sources.

SUMMARY OF CERTAIN EMBODIMENTS

Broadly speaking, certain embodiments of the invention relate to a remote controller device that, according to one embodiment, includes a remote controller display screen of the remote controller device on which can be displayed content information (e.g., an electronic programming guide (i.e., "EPG"), and/or information relating to content that can be played on a TV. A first item of content is played on the TV that can be controlled by the remote controller device. In response to a first user command for preliminarily selecting a second item of content that currently is not being played on the TV, the second item of content is played on the remote controller device while the TV continues to play the first item of content. In response to a second user command for finally selecting the second item of content, the remote controller device transmits to the TV a selection command that directs the TV to play the second item of content on the TV.

In one variation, the TV displays a first item of video content. The remote controller device comprises a display screen and a processor in communication with the display screen. The processor is operable to:
- display content information relating to a plurality of content titles;
- receive a first user command for a preliminary selection by a user of one of the plurality of content titles;
- receive a second item of video content in response to the first user command;
- display the second item of video content on the remote controller display screen while the TV is displaying the first item of video content;
- receive a second user command for a final selection by the user of the one of the plurality of content titles; and
- transmitting a selection command to the TV that directs the TV to play the second item of video content on the TV.

In another variation, the display screen of the remote controller ("remote controller display screen") is a touch screen having a first area for the displaying of the second item of video content and a second area for the displaying of the content information. The first user command corresponds to a touching by the user of the second area, and the second user command corresponds to a second touching by the user of the remote controller display screen.

In another variation, the plurality of other items of video content are provided by an over-the-air broadcast system, a cable television distribution system, a satellite television distribution system, or a fiber optic television distribution system.

In an alternative embodiment, the remote controller comprises means for displaying a plurality of content titles on a remote controller display screen while a TV is displaying a first item of video content. The plurality of content titles is associated with a plurality of items of video content. The remote controller further includes means for receiving a first user command for a selection by a user of one of the plurality of content titles and means for displaying a second item of video content on the remote controller display screen in response to the first user command while the TV is displaying the first item of video content. The second item of video content is one of the plurality of items of video content that is associated with the selected one of the plurality of content titles. The remote controller further comprises means for causing the TV to display the second item of video content in response to a second user command.

There are additional aspects to the present inventions. It should therefore be understood that the preceding is merely a brief summary of some embodiments and aspects of the present inventions. Additional embodiments and aspects are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

BRIEF DESCRIPTION OF THE DRAWINGS

These and/or other aspects and advantages of the present invention will become apparent and more readily appreciated from the following description of certain embodiments, taken in conjunction with the accompanying drawings of which.

DETAILED DESCRIPTION

Figure 1:
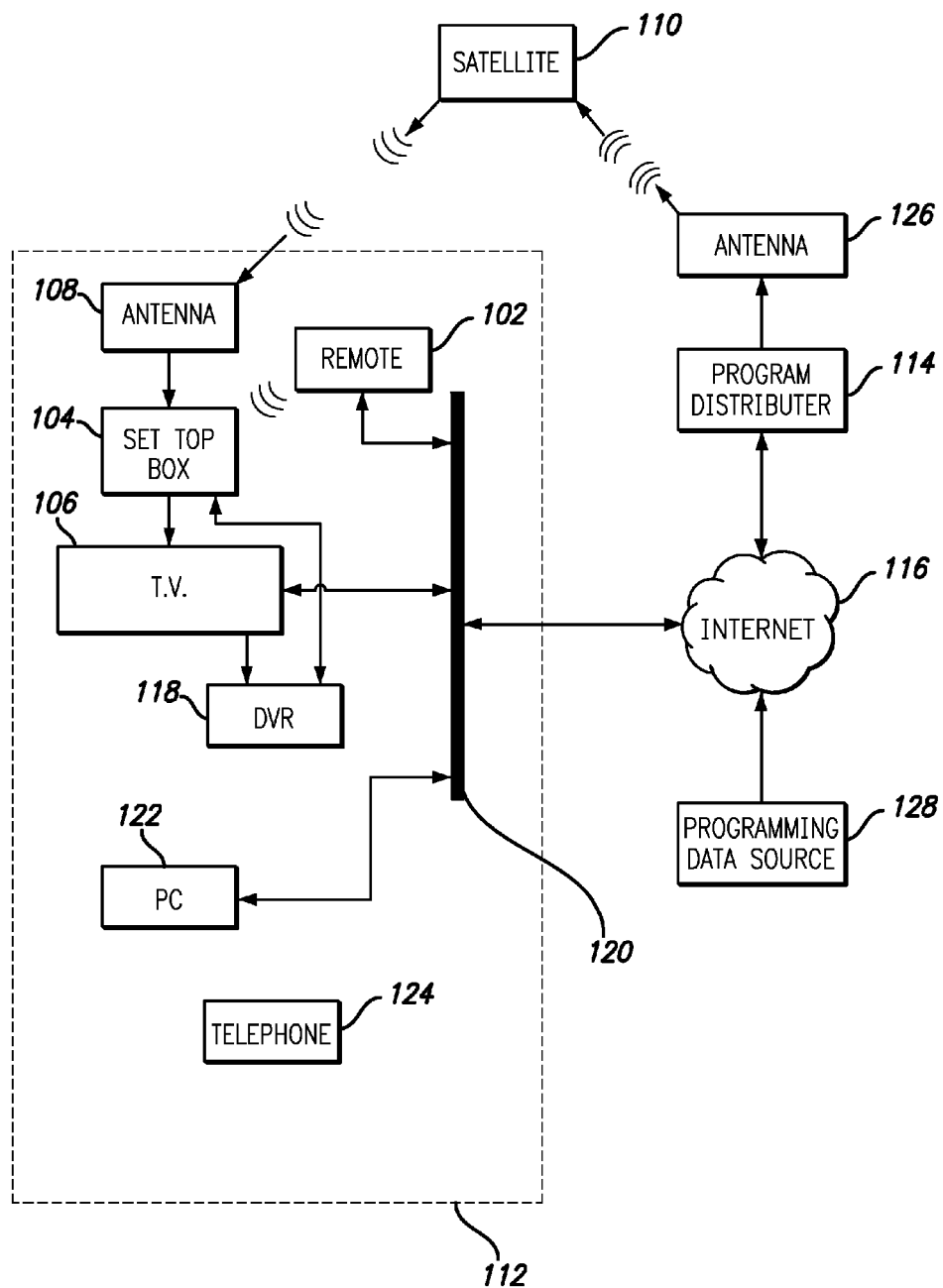
FIG. 1 is a simplified block diagram of an operating environment in which a remote controller may be used in accordance with certain embodiments of the invention.

The following description is of the best mode presently contemplated for carrying out the invention. Reference will be made in detail to embodiments of the present invention, examples of which are illustrated in the accompanying drawings, wherein like reference numerals refer to like elements throughout. It is understood that other embodiments may be used and structural and operational changes may be made without departing from the scope of the present invention.

FIG. 1 is a simplified block diagram of an operating environment in which embodiments of a remote controller 102 may be used. This illustrates just one example of an operating environment and it should be appreciated that the various other embodiments discussed herein are not limited to such an environment.

Content and service providers such as, for example, video, audio, data providers, and TV service providers, provide users with programming and/or data which often is provided to a receiving device such as, for example, a set top box 104, that is in communication with a TV 106, or other device having a display screen and configured to receive and display the programming.

The set top box 104 in turn is in communication with a satellite antenna 108 configured to receive a signal from a communications satellite 110. In alternative embodiments the set top box 104 communicates with other data or programming sources such as, for example, an Ethernet portal, a telephone company network, a cable head-end, a terrestrial antenna, etc., that provide the programming or data. The set top box 104 processes and communicates the selected programming to the TV 106 and/or to one or more other TVs, presentation devices or storage devices.

While the illustrated embodiment shows a set top box 104, alternative embodiments include any suitable converter device or electronic equipment that is operable to receive programming. Examples of such alternative devices include a TV recording device, TV tuner, TV converter, receiver, satellite receiver, cable set-top box, cable receiver, media player, and/or TV receiving device. In some embodiments, another remote-control device (not shown in FIG. 1) other than the illustrated remote controller 102 is operable to control the TV 106 and other user devices.

While the illustrated embodiment shows the TV 106, alternative embodiments include other devices for the presentation of content or data such as, for example, a digital video recorder ("DVR"), a game system, a personal computer, a sound system receiver, a compact disk ("CD") device, etc. Certain of these devices have one or more speakers, a display, or other output components to present video or audio content to a user.

In some embodiments, a plurality of TVs or related devices for the presentation of content/data are disposed in or near a user's premises 112 and are in direct or indirect communication with the set top box 104. Further, the set top box 104 and the TV 106 may be integrated into a single device having the above-described functionality of the set top box 104 and the TV 106, in addition to having other functionality.

A plurality of content providers provides program content, such as TV or audio content, to a program distributor 114. Content providers can include special content providers that broadcast premium based programming or pay-per-view programming, TV stations that send TV programming, or radio stations that broadcast audio programming.

Program content, or programs, is sent to the program distributor 114 from the content providers through the Internet 116, although alternative embodiments include other communication media such as, for example, satellite systems, digital subscriber line ("DSL") systems, radio frequency ("RF") systems, telephony systems, cable systems, fiber optic systems, microwave systems, asynchronous transfer mode ("ATM") systems, internets, intranets and frame relay systems. Moreover content and data can be communicated by combinations of the foregoing communications media. In addition to program content Electronic Programming Guide ("EPG") data or similar such data is provided from a programming data source 128 to the user's premises 112 via the Internet 116.

The received program content is converted by one or more devices at the program distributor 114 into a suitable signal that is communicated or "uplinked" by an antenna 126 to the satellite 110. The uplinked signal is received by the satellite 110 and then communicated or "downlinked" from the satellite 110 onto a geographical region. The receiver antenna 108 receives the downlink satellite signal. In alternative embodiments the receiver antenna 108 is operable to receive signals from a plurality of satellites or from terrestrial transmitters.

The receiver antenna 108 is disposed at or near the user's premises 112 which can include, for example, a residence, a business, or any other location operable to receive satellite signals. The received satellite signal is communicated to the set top box 104 which amplifies and converts the received signal into a signal suitable for communication to the TV 106 or another user device such as, for example, a digital video recorder (DVR) 118.

In alternative embodiments rather than the DVR 118 (or in addition to the DVR 118), other devices may be used that are operable to receive a signal from the set top box 104, another endpoint device, or from other devices external to the premises 112. Additional examples of such devices include a compact disk ("CD") recorder, a digital video disc ("DVD") recorder, other optical media recorders, a personal video recorder ("PVR"), game devices, magnetic tape recorders, RF transceivers, and personal computers ("PCs").

The remote controller 102 serves as an interface between a user and the set top box 104. The remote controller 102 communicates with the set top box 104 using a wireless medium, such as infrared ("IR"), RF, Bluetooth, etc., or alternatively communicates with the set top box 104 via a local network 120. The remote controller 102 also communicates with the TV 106 via the local network 120. (In alternative embodiments the remote controller 102 communicates directly and wirelessly with both the set top box 102 and the TV 106.) In addition to the DVR 118 which is in communication with the set top box 104, other devices (not shown) may also be in communication with the set top box 104 such as, for example, pointing devices, game device controllers, keyboards, etc.

In alternative embodiments, the set top box 104 may receive content, video streams and data from sources other than the antenna 108 such as, for example, from locally broadcast RF signals, from the Internet 116 (via live streaming or otherwise) or from other communication systems.

The user's premises 112 includes other devices that are in communication with the Internet 116. The premises 112 includes the local network 120 to which a PC 122, the TV 106 and the remote controller 102 are communicatively coupled. In alternative embodiments other devices such as, for example, data storage devices, the set top box 104, game systems, sound system receivers, Internet connection devices, digital subscriber loop ("DSL") devices, wireless LAN, WiFi, Worldwide Interoperability for Microwave Access ("WiMax"), etc., are communicatively coupled with the local network 120 so that all such devices may communicate with one another and with the Internet 116. Thus, the local network 120 allows these interconnected devices, and the set top box 104, to communicate with each other. In addition, a telephone 124 located on the premises 112 is connected to another communication system (not shown) by using a hardwire connection along with an RF signal or alternatively by using a wireless cellular connection.

According to one embodiment, the remote controller 102 retrieves recent TV or other programming listings from a web server via the Internet 116 and displays them on a touch screen that is disposed on the remote controller 102. The TV 106 is connected to the local network 120 so that the remote controller 102 can remotely control the TV 106 through a network connection and send channel change commands. (Additionally or alternatively, the remote controller 102 communicates with the TV 106 by a signal sent from the remote controller 102 wirelessly to the set top box 104 (or directly to the TV 106) via RF, laser, IR, Blutooth or other wireless protocols.) In addition, the remote controller 102 can remotely control a TV tuner connected to the PC 122, send channel change commands, and stream the video content from the PC's TV tuner via the local network 120 to the remote controller 102 which in turn functions as a remote display. The remote controller 102 is hardware accelerated and uses the Sigma dedicated hardware to execute graphics operations as well as to decode images, and runs at high performance on the remote controller 102, e.g., about 25 FPS. This dedicated hardware is produced by Sigma Designs, Inc. of Milpitas, Calif. Thus the remote controller 102 permits a user to view one item of video content (provided by the PC's TV tuner, for example) while the TV 106 displays a different item of video content provided by the TV's tuner.

According to this embodiment, the remote controller 102 has a capacitive multi-touch screen, an accelerometer and network-connectivity. The remote controller 102 is implemented using the Cairo graphics library and DirectFB. DirectFB is a thin library that provides hardware graphics acceleration as well as hardware image decoding and hardware video playback. Cairo is a platform-independent 2D graphics library with support for hardware acceleration. The remote controller 102 uses Cairo accelerated through DirectFB. TV listings or program data is retrieved as XML data through a SOAP request to "Schedules Direct," the details of which can be seen at http://www.schedulesdirect.org. SOAP is a simple XML-based protocol for allowing applications to exchange information over HTTP. Schedules Direct is a non-profit organization that provides program listings data from the Zap2it service of Tribune Media Services, Inc. of Chicago, Ill.

The remote controller 102, according to this embodiment, supports user touch input by reading from the input device —/dev/input/event0—and supports a mouse as well. A user can scroll the contents of the remote controller 102 by sliding his/her finger on the touch screen or by using the mouse. The remote controller 102 communicates with the TV 106 through a network socket via the local network 120. On the TV 106, a daemon accepts channel change commands from the remote controller 102 and then changes the channel programmatically.

The daemon of this embodiment uses X2 APIs to change the channel and execute other input commands. X2 APIs refer to a library of software developed by Sony Corporation for use in controlling TVs such as, for example, for use in changing channels and drawing images to the screen. However alternative embodiments may use other software for these functions. On the PC 122, a TV viewer application accepts channel change commands (and other commands) from the remote controller 102, and then executes the commands for sending a plurality of items of content to the remote controller 102 via the local network 120. The TV viewer application is implemented using DirectFB and Video4Linux APIs. The TV viewer application retrieves the content from the PC's TV tuner and changes the channel using Video4Linux APIs. Video4Linux is a set of APIs implemented in the Linux kernel that provides an interface for video capture and playback.

With this embodiment the TV viewer reads from the device —/dev/video0—and copies it into a DirectFB surface which is then rendered to the screen. Video content is encoded in uyvy pixel format which is loaded directly into the DirectFB surface. The TV viewer also plays back audio (in stereo) from the PC's TV tuner. In particular it reads from /dev/dsp and writes the content back to /dev/dsp, essentially functioning as a full-duplex device. Both the remote controller 102 and the TV viewer are platform-independent. The TV viewer will run on any device that has standard Video4Linux drivers which are integrated directly in the Linux kernel. The TV viewer runs at 30 FPS on the PC 122 (which is the frame rate of the NTSC TV signal). The TV viewer of this embodiment also reads the TV video signal at a resolution of 720×480 and then scales it to the monitor's resolution (e.g., 1680×1050) allowing the user to watch the TV full screen.

The remote controller 102 of this embodiment maintains a frame-rate of about 25 FPS, even during scrolling animation and video playback. The TV viewer running on the PC 122 maintains a frame-rate of about 30 FPS. The daemon running on the TV 106 performs channel change commands and implements streaming of TV signal content from the TV 106 to the remote controller 102.

With this embodiment, by taking full advantage of the embedded hardware of the remote controller 102, high performance can be achieved. The TV signal can be streamed from the PC's TV Tuner to the remote controller 102 at the TV's native signal resolution (e.g., 720×480), the current TV program listings can be retrieved from the Internet 116 via the local network 120, and both the TV 106 and the PC's TV Tuner can be controlled with the remote controller 102.

While the above-described embodiments include the use of the PC's TV tuner to provide the content to the remote controller 102, alternative sources of content for the remote controller 102 include:

a signal from the set top box 104 (as received from the satellite 110, or from a cable head-end or an antenna for a terrestrial RF signal) to a tuner on the TV 106, which in turn transmits to the remote controller 102 wirelessly or via the local network 120;

a signal from an antenna for a terrestrial RF signal directly to a tuner of the TV 106, which in turn transmits to the remote controller 102 wirelessly or via the local network 120;

a signal from the DVR 118 (or from a DVD player, a game system, a sound system receiver, a compact disk ("CD") device, etc.) sent wirelessly directly to the remote controller 102, or send via the local network 120, the TV 106 or the set top box 104 to the remote controller 102; and a signal from the Internet 116 to the TV 106, the DRV 118 or the set top box 104, and then from one of these devices sent to the remote controller 102 wirelessly or via the local network 120.

It therefore is apparent that the operating environment of this embodiment permits a user to receive and play items of video content or programs in real time as a continuous signal or stream of data as it arrives via a broadcast from a third party content provider or program distributor. Additionally if the user so desires, the items of content or programs can be received (or downloaded) and then stored for playing at a later point in time that is not in real time.

The above description of the operating environment, including the user's premises 112 and the various devices disposed therein, is intended as a non-limiting overview of one of various embodiments of an operating environment in which a remote controller, like the remote controller 102 of FIG. 1, may be implemented. The devices in the user's premises 112 and the internal and external communication systems, may contain other devices, systems and media not specifically described herein.

Figure 2:
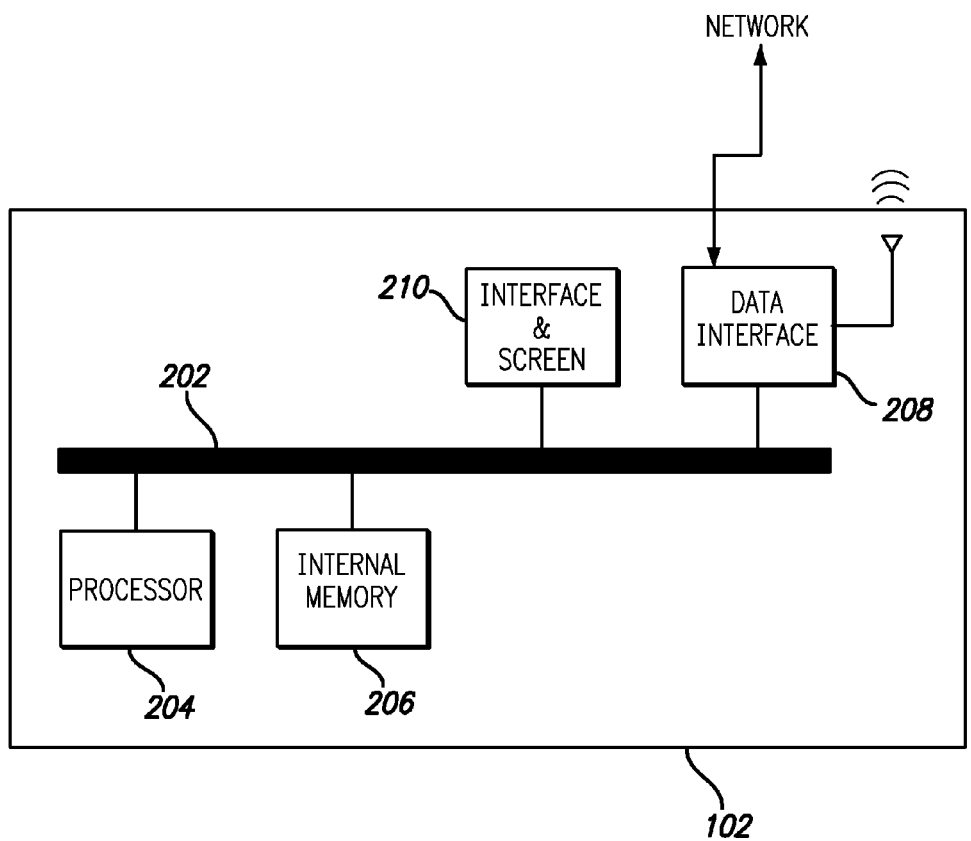
FIG. 2 is a simplified block diagram of the remote controller of FIG. 1.

Turning now to FIG. 2, the remote controller 102 of FIG. 1 is depicted wherein the elements shown inside the solid line denoted by reference numeral 102 are integrated into the remote controller device itself and are not external thereto. In this illustrative embodiment, a system bus 202 serves to interconnect a processor 204, an internal memory 206, data interface circuitry 208 and a user interface 210. The operation of the remote controller 102 is controlled by the processor 204 via the bus 202.

The processor 204 receives input from and produces output to the user interface 210 that incorporates, for example, a touch screen display and/or optionally a collection of control keys that operate in a conventional manner. However in alternative embodiments, the user interface 210 can include one or more of a keypad, a mouse, a microphone input and a display. The remote controller 102 may also act in combination with the display of the TV 106 (FIG. 1) so as to produce a distributed interface with the TV 106 being used to convey, for example, a menu of items that can be selected by a user as a portion of the processes described. Hence, the distributed user interface can be considered equivalent in many respects to a unitary user interface confined to the remote control for certain embodiments.

The data interface 208 is also in communication with the bus 202. This data interface 208 as depicted can represent a wireless interface or plurality of wireless interfaces for both television commands (such as, for example, channel change, volume control, channel selection, menu selections, etc.) directed to the TV 106 as well as an interface for requesting and/or receiving programming schedules including, for example, Electronic Programming Guide ("EPG") information, and updates either from the set top box 104 or via the connection to the Internet 116 or other data networks that accesses a programming data source.

The data interface 208 provides for communication between the remote controller 102 and the TV 106 either via the local network 120, or directly via the set top box 104 (FIG. 1). Communication can be achieved by using, for example, either radio frequency (RF) communications or via infrared (IR) communication circuits.

Figure 3:
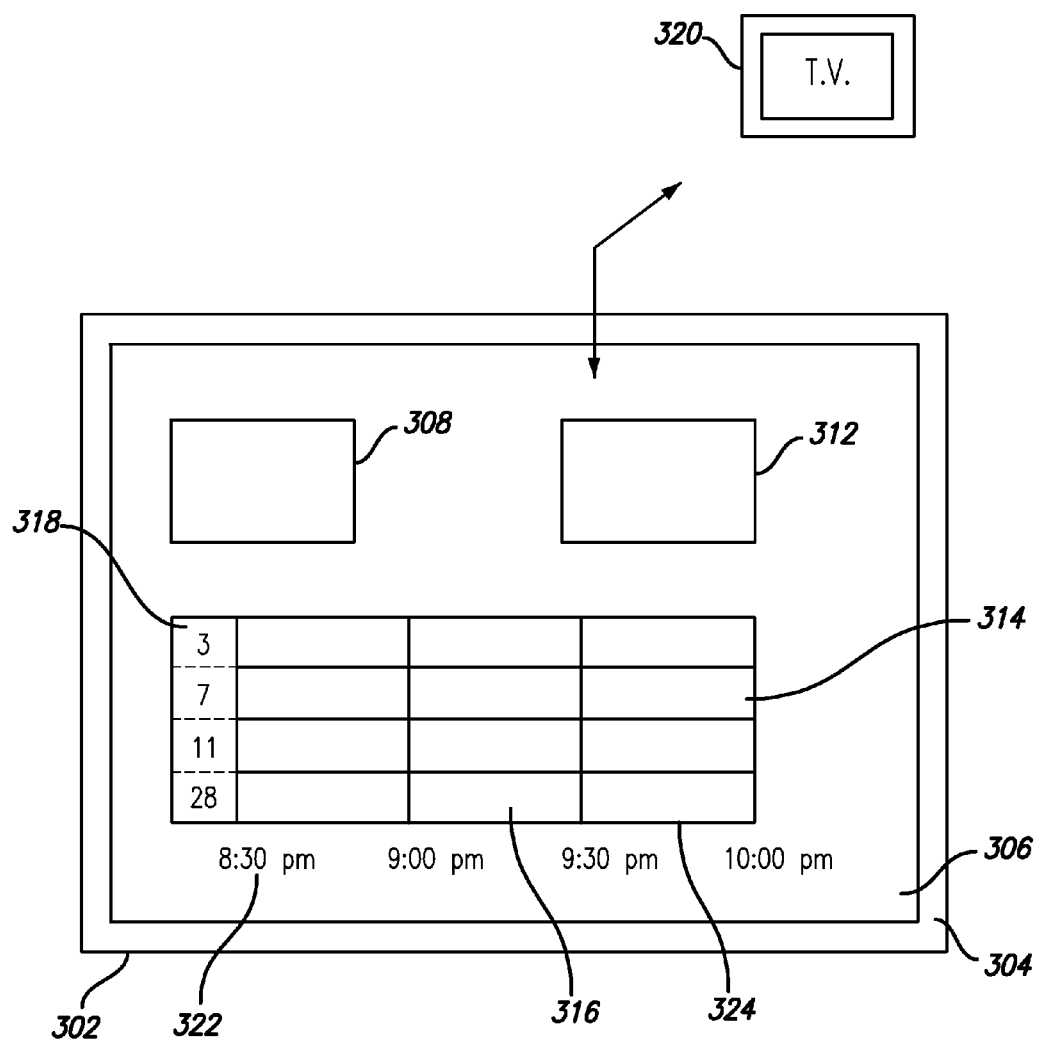
FIG. 3 is an external view of a remote controller in accordance with another embodiment of the invention.

FIG. 3 illustrates an external view of a remote controller 302 according to an embodiment of the invention. The remote controller 302 includes a housing 304 and a touch screen 306 mounted on the housing 304. The housing 304 is sufficiently small in size so that it can conveniently be held by one hand of a user. The touch screen 306 serves as a user interface for receiving user commands and displaying graphics, data, video, other information, etc. FIG. 3 further illustrates one mode of operation wherein the touch screen 306 displays a first item of video content in a first area 308 of the touch screen 306. In a second area 312 of the touch screen 306, there is further displayed metadata relating to a program that currently is being shown on a TV 320 that is being controlled by the remote controller 302. Such metadata can include, for example, a title of a program being displayed by the TV 320, the start and end times of the program, the identity of the programming channel and a brief description of the nature of the program or, if applicable, a story plot line of the program.

In a third area 314 of the touch screen 306, available programming content information such as, for example, EPG information is displayed. In the illustrated embodiment, the programming content information is presented in a matrix 324 comprised of a plurality of rectangular-shaped areas 316 disposed in rows and columns. Each row corresponds to one of a plurality of programming channels and includes a rectangular-shaped area for channel number information 318 and a plurality of rectangular-shaped areas for a plurality of program names or titles for those programs that are being or will be provided via the programming channel. Start times of day 322 for the programs are also displayed at the bottom of the matrix.

In operation according to one embodiment the remote controller 302 (including its processor) receives a first item of video content and displays that item of video content in real time on the first area 308 of the touch screen 306 while the TV 320 simultaneously is displaying in real time the same item of video content as it is being broadcast by a content provider or program distributor. The remote controller 302 further receives content programming information in the form of a plurality of content titles (or program names) that are associated with a plurality of other items of video content. These titles are displayed in the matrix 324 on the remote controller's touch screen 306 simultaneously with the displaying of the first item of video content.

When a user touches an area of the touch screen 306 corresponding to a title of a program that is different than the one currently being displayed on the TV 320, the processor of the remote controller 302 receives this as a user command for a preliminary selection of that content or program. (In the illustrated embodiment the user would touch one of the rectangular-shaped areas 316.) In response to this command, the processor of the remote controller 302 receives a second item of video content that is the item of video content that is associated with the program title selected by the user. The remote controller 302 then displays the second item of video content on the first area 308 of its touch screen 306 (while continuing to display the content programming information in the third area 314) while the TV 320 continues to display in real time the first item of video content.

Thus by looking at the remote controller touch screen 306, the user can make a preliminary selection and see the video of the other channel that has been selected. (By repeating the previously-described operations, the user can make other preliminary selections for viewing other items of video content on the touch screen 306.) Should the user decide to watch the program or video of the other channel on the TV 320, this final selection is made by touching the area of the touch screen 306 that is displaying the second item of video content which in this embodiment would be the first area 308. The processor of the remote controller 302 receives this as a user command for causing the TV 320 to change channels (or to otherwise change its reception to another content source) and to display the second item of video content thereby allowing the user to watch this selected program on the TV 320.

In one embodiment the TV 320 includes a first tuner and a second tuner, and the processor of the remote controller 302 is operable to receive the first item of video content from the first tuner and the second item of video content from the second tuner. In other embodiments, the TV 320 includes one tuner and the processor of the remote controller 302 communicates directly or indirectly with a network such as, for example, the Internet. The remote controller 302 thereby receives the first item of video content from the TV tuner and the second item of video content from the network. In yet other embodiments, the remote controller 302 communicates directly or indirectly with a network and receives both the first and second items of video content from the network.

As previously mentioned the content programming information is displayed on the touch screen 306 as a matrix 324 with each row corresponding to a channel and program titles provided on that channel, and each column corresponding to a list of channel numbers or a time of day that is a start time for each program, as the case may be. Using the touch screen 306, the user can scroll the matrix 324 from left to right and from right to left in order to see the programs that are available for the displayed channels for different days and/or different times of day. Additionally the user can scroll the matrix 324 from top to bottom or from bottom to top in order to see different program channels and the names of the programs that are available for those channels.

As previously discussed, the source of the content programs can include one or more of (1) an over-the-air broadcast system, (2) a cable television distribution system, (3) a satellite television distribution system, and (4) a fiber optic television distribution system. Some of these content sources provide video-on-demand programming. Therefore an embodiment of the invention includes a remote controller that can receive, in addition to standard programming, a plurality of items of video content that includes the video-on-demand programming along with their associated program titles. The touch screen of the remote controller can display these titles, and when the user touches an appropriate area of the touch screen for a title of interest, the touch screen will display the selected on-demand program (or at least display a portion of this program) while the TV continues to display a different program or video. As before the user can elect to watch the on-demand program on the TV by touching an area of the remote controller touch screen that is associated with this program, whereupon the remote controller will cause the TV to change channels and likewise display the selected on-demand program.

In alternative embodiments, while a TV is displaying a first item of video content a remote controller can receive items of video content from other sources such as, for example, from a digital video recorder (DVR) configured to store a plurality of content titles and a plurality of items of video content, or from a digital video disk (DVD) player holding a DVD disk containing at least one item of DVD video content having a DVD content title. The remote controller touch screen displays the titles of the content stored on the DVR and/or the DVD recorder, and in response to a user selection of one of the displayed titles, the touch screen shows the video content from the DVD or DVR corresponding to the selected title. The video content from the DVR or DVD is transmitted directly or indirectly from the DVD or DVR to the remote controller. Once again, if the user chooses to watch the selected content from the DVD or DVR on the TV, the user touches the appropriate area of the touch screen thereby inputting a command to cause the remote controller to cause the TV to display the selected content from the DVR or DVD.

In an alternative embodiment, while a TV is displaying a first item of video content a remote controller receives other content from Internet sources, including from an Internet on-demand video streaming service or from a video sharing web site that permits users to upload, share and view videos. Therefore in addition to standard broadcast programming, the remote controller receives a plurality of other items of video content that includes the content originating from an Internet on-demand video service and/or a video sharing web site along with their associated program titles. The remote controller touch screen can display these titles, and when the user touches an appropriate area of the touch screen for a title of interest, it will display a video stream of the content of interest while the TV continues displaying the first item of video content. As before the user can elect to watch this Internet-sourced video on the TV by touching an area of the remote controller touch screen that is associated with this video, whereupon the remote controller will cause the TV to receive and display this video.

In an alternative embodiment, while the TV is displaying a first item of content, a remote controller touch screen displays a portion of a second item of video content corresponding to content that is currently not being shown on the TV. However the remote controller does not display the second item of video content in its entirety. Rather the processor of the remote controller receives only the portion of this second item of video content which has a duration of a predetermined amount of time such as, for example, about 30 seconds, or so, and stores this portion in the controller's memory. The remote controller touch screen then displays this portion of the second item of video content portion in a loop while the TV continues to display the first item of video content. Such an embodiment is believed to be advantageous in that it would reduce the communication bandwidth necessary for operation of the remote controller as compared with some of the other embodiments described herein. As before the user can elect to watch the program associated with the second item of video content on the TV by touching an area of the remote controller touch screen that is associated with the portion of the second item of video content, whereupon the remote controller will cause the TV to receive and display the second item of video content in its entirety.

In an alternative embodiment, while a TV is displaying a first item of video content a remote controller touch screen displays a plurality of program or content titles. Upon receipt of a user command for a selection of one of the program titles, the processor of the remote controller receives a portion of a second item of video content corresponding to the selected program and extracts a video frame taken from that portion of the second item of video content, which is content that currently is not being shown on the TV. The processor then displays on the touch screen the video frame (as a stationary image) while the TV continues to display the first item of video content. As before the user can elect to watch on the TV the program that is associated with the still image by touching an area of the remote controller screen that is associated with the still image, whereupon the remote controller will cause the TV to receive and display the selected program.

Figure 4:
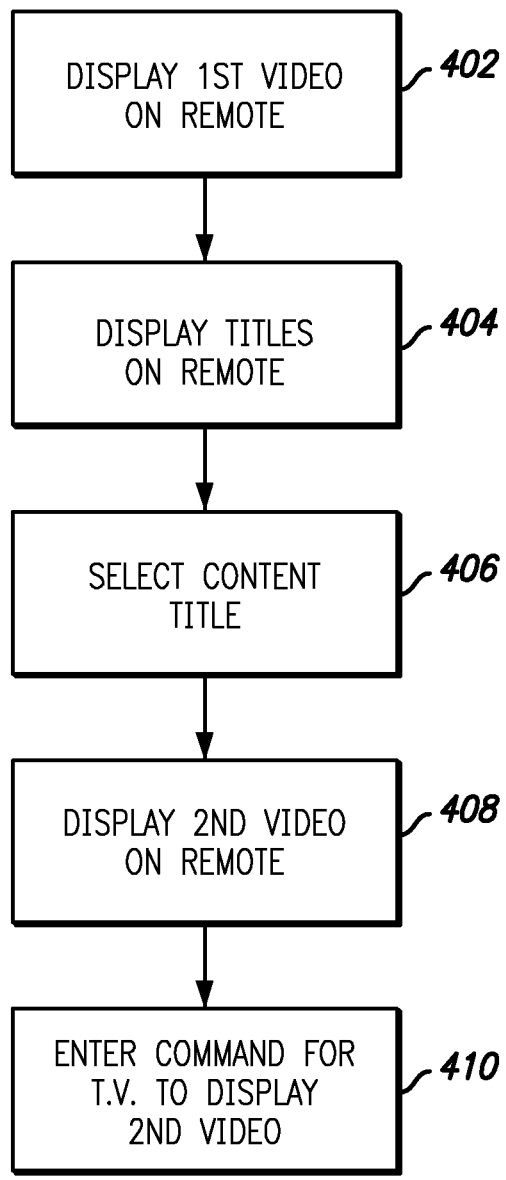
FIG. 4 is a simplified process flow diagram of a method of operating a remote controller that is operable to control a TV in accordance with another embodiment of the invention.

FIG. 4 is a simplified process flow diagram of a method of operating a remote controller that is operable to control a TV. A first item of video content is displayed on a display screen of the remote controller while the TV also is displaying the first item of video content. (Step 402) A plurality of content titles associated with a plurality of other items of video content is received by the remote controller and displayed on the remote controller's display screen simultaneously with the displaying of the first item of video content on the remote controller's display screen. (Step 404) A first user command is entered for a selection by a user of one of the plurality of content titles that is displayed on the controller's display screen. (Step 406) In response to this command, a second item of video content (corresponding to the selected content title) is received and displayed on the controller display screen while the TV continues displaying the first item of video content. (Step 408) Finally, a second user command is entered for causing the TV to change channels (or otherwise change its reception to another content source) and to display the second item of video content. (Step 410)

In view of the above, it will be appreciated that certain embodiments of the invention overcome many of the longstanding problems in the art by providing a remote controller device that includes a display screen on which can be displayed a first item of video content as well as video content programming information. The first item of video content is displayed on the remote controller display screen and corresponds to the same video content that simultaneously is being displayed on a screen of the TV that can be controlled by the remote controller. In response to a user command for selecting a program that currently is not being shown on the TV, a second item of video content is displayed on the remote controller display screen while the TV continues to show the first item of video content. In response to another user command, the remote controller causes the TV to change channels (or otherwise change its reception to another content source) and display the second item of video content.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. A remote controller device operable to control a television, the remote controller device comprising:
   a remote controller display screen, wherein the remote controller display screen is a touch screen: and
   a processor in communication with the remote controller display screen and configured to:
   concurrently display on the remote controller display screen a first item of video content in real time, wherein an area of the remote controller display screen consisting of the display of the first item of video content is a video content display area of the remote controller display screen, metadata of the first item of video content, and available programming content information of other items of video content that can be displayed on the television and are different from the first item of video content, wherein the first item of video content is displayed while the television is concurrently displaying in real time the first item of video content,
   receive a first user command for preliminarily selecting a second item of video content that is different from the first item of video content being displayed on the television, the first user command comprising the user touching only a second item area of the remote controller display screen, wherein the second item area is different from the video content display area and corresponds to the second item of video content,
   receive the second item of video content in response to the first user command, in response to the first user command and while the television continues to display the first item of video content, replace the first item of video content displayed on the remote controller display screen with the second item of video content, wherein the second item of video content is displayed concurrently with the available programming content of the video content that can be displayed on the television and the metadata of the first item of video content,
   after replacing the first item of video content displayed on the video content display area with the second item of video content in response to the first user command selecting the second item area, receive a second user command for finally selecting the second item of video content, the second user command comprising touching by the user of only the second item of video content of the video content display area of the remote controller display screen while the second item of video content is displayed on the video content display area of the remote controller display screen, and
   in response to the second user command transmit to the television a selection command that causes the television to display the second item of video content on the television.

2. The remote controller device of claim 1 wherein the available programming content information of video content that can be displayed on the television includes a plurality of content titles.

3. The remote controller device of claim 2 wherein the preliminary selection includes selecting one of the plurality of content titles.

4. The remote controller device of claim 1 wherein the second item of video content is provided by one of an over-the-air broadcast system, a cable television distribution system, a satellite television distribution system, and a fiber optic television distribution system.

5. The remote controller device of claim 4 wherein the second item of video content is video-on-demand programming provided by the one of the over-the-air broadcast system, the cable television distribution system, the satellite television distribution system, and the fiber optic television distribution system.

6. The remote controller device of claim 1 wherein the television is in communication with a digital video recorder configured to store the second item of video content and the available programming content information of video content that can be displayed on the television, and wherein processor being configured to receive the second item of video content includes being configured to receive the second item of video content from the digital video recorder.

7. A remote controller device operable to control a television and in communication with a digital video disk (DVD) player configured to hold a DVD disk containing an item of DVD video content having a DVD content title, the remote controller device comprising:
   a remote controller display screen, wherein the remote controller screen is a touch screen: and
   a processor in communication with the remote controller display screen and configured to:
   concurrently display on the remote controller display screen a first item of video content in real time, wherein an area of the remote controller display screen consisting of the display of the first item of video content is a video content display area of the remote controller display screen, metadata of the first item of video content, and available programming content information of other items of video content that can be displayed on the television and are different from the first item of video content, wherein the first item of video content is displayed while the television is concurrently displaying in real time the first item of video content, receive the DVD content title and to display the DVD content title on the remote controller display screen, receive a first user command for a selection by the user of the DVD content title, the first user command comprising the user touching only a DVD content title area of the remote controller display screen, wherein the DVD content title area is different from the video content display area and corresponds to the DVD content title, receive the DVD video content from the DVD player in response to the first user command, while the television continues to display the first item of video content, replace the first item of video content displayed on the remote controller display screen with the DVD video content, wherein the DVD video content is displayed concurrently with the DVD content title and the metadata of the first item of video content, after replacing the first item of video content displayed on the video content display area with the second item of video content in response to the first user command selecting the DVD content title area, receive a second user command for finally selecting the DVD video content, the second user command comprising touching by the user of only the second item of video content of the video content display area of the remote controller display screen while the DVD video content is displayed on the video content display area of the remote controller display screen, and in response to the second user command transmit to the television a selection command that causes the television to display the DVD video content on the television.

8. The remote controller device of claim 1 wherein the second item of video content is a portion of a third item of video content, wherein the processor is further configured to store the second item of video content, and wherein the processor being configured to display the second item of video content includes being configured to display the second item of video content in a loop.

9. The remote controller device of claim 1 wherein the television includes a first tuner and a second tuner, and wherein the processor is configured to receive the first item of video content from the first tuner and the second item of video content from the second tuner.

10. The remote controller device of claim 1 wherein the processor is further configured to communicate with a network and to receive the first and second items of video content from the network.

11. The remote controller device of claim 1 wherein the television includes a tuner, and wherein the processor is further configured to communicate with a network and to receive the first item of video content from the tuner and to receive the second item of video content from the network.

12. The remote controller device of claim 1 wherein the processor is further configured to communicate with a network, wherein the second item of video content and the available programming content of video content that can be displayed on the television are provided by an Internet on-demand video streaming service, and wherein the processor being configured to receive the second item of video content includes being configured to receive the second item of video content from the Internet on-demand video streaming service via the network.

13. The remote controller device of claim 1 wherein the processor is further configured to communicate with a network, wherein the second item of video content and the available programming content information of video content that can be displayed on the television are provided by a video sharing web site configured to permit users to upload, share and view videos, and wherein the processor being configured to receive the second item of video content includes being configured to receive the second item of video content from the video sharing web site via the network.

14. A remote controller device operable to control a television, the remote controller device comprising:
a remote controller display screen, wherein the remote controller display screen is a touch screen: and
a processor in communication with the remote controller display screen and configured to:
concurrently display on the remote controller display screen a first item of video content in real time, wherein an area of the remote controller display screen consisting of the display of the first item of video content is a video content display area of the remote controller display screen, metadata of the first item of video content, and available programming content information of other items of video content that can be displayed on the television and are different from the first item of video content, the available programming content information including a plurality of content titles, wherein the first item of video content is displayed while the television is concurrently displaying in real time the first item of video content, receive a first user command for a preliminary selection by a user of one of the plurality of content titles, the first user command comprising the user touching only a second item area of the remote controller display screen, wherein the second item area is different from the video content display area and corresponds to one of the plurality of content titles, receive a portion of a second item of video content corresponding to the selected content title in response to the first user command, extract a video frame from the portion of the second item of video content, in response to the first user command and while the television continues to display the first item of video content, replace the first item of video content displayed on the remote controller display screen with the video frame as a stationary image on the remote controller display screen, wherein the video frame is displayed concurrently with the available programming content information including the plurality of content titles and the metadata of the first item of video content, after replacing the first item of video content displayed on the video content display area with the second item of video content in response to the first user command selecting the second item area, receive a second user command for finally selecting the second item of video content, the second user command comprising touching by the user of only the second item of video content of the video content display area of the remote controller display screen while the video frame is displayed on the video content display area of the remote controller display screen, and in response to the second user command transmit a selection command to the television that causes the television to display the second item of video content on the television.

15. A method of operating a remote controller device operable to control a television, the method comprising:
concurrently displaying on a remote controller display screen of the remote controller device, wherein the remote controller display screen is a touch screen, a first item of video content in real time, wherein an area of the remote controller display screen consisting of the display of the first item of video content is a video content display area of the remote controller display screen, metadata of the first item of video content, and available programming content information of other items of video content that can be displayed on the television and are different from the first item of video content, the available programming content information including a plurality of content titles wherein the first item of video content is displayed while the television is concurrently displaying in real time the first item of video content;
entering a first user command for a preliminary selection by a user of one of the plurality of content titles, entering the first user command comprising the user touching only a second item area of the remote controller display screen, wherein the second item area is different from the video content display area and corresponds to a second item of video content corresponding to the selected content title; and
replacing the first item of video content displayed on the remote controller display screen with the second item of video content in response to the first user command and while the television is displaying the first item of video content, wherein the displaying of the second item of video content occurs concurrently with the displaying of the available programming content information including the plurality of content titles and the metadata of the first item of video content
after replacing the first item of video content displayed on the video content display area with the second item of video content in response to the first user command selecting the second item area, entering a second user command for finally selecting the second item of video content, the second user command comprising touching by the user of only the second item of video content of the video content display area of the remote controller display screen while the second item of video content is displayed on the video content display area of the remote controller display screen, and
in response to the second user command transmit to the television a selection command that causes the television to display the second item of video content on the television.

16. The method of claim 15 wherein the second item of video content is provided by one of an over-the-air broadcast system, a cable television distribution system, a satellite television distribution system, and a fiber optic television distribution system.

17. The method of claim 16 wherein the second item of video content is video-on-demand programming provided by the one of the over-the-air broadcast system, the cable television distribution system, the satellite television distribution system, and the fiber optic television distribution system.

18. The method of claim 15 wherein the television is in communication with a digital video recorder configured to store the second item of video content, the available programming content information including the plurality of content titles and a plurality of other items of video content, and wherein the displaying of the second item of video content includes displaying the second item of video content as received from the digital video recorder.

19. The method of claim 15 wherein the television is in communication with a digital video disk (DVD) player configured to hold a DVD disk containing an item of DVD video content having a DVD content title, wherein the DVD content title is included in the plurality of content titles and the second item of video content is the item of DVD video content.

20. The method of claim 15 further comprising storing the second item of video content in a memory of the remote controller device, wherein the second item of video content is a portion of a third item of video content, and wherein the displaying of the second item of video content on the remote controller display screen includes displaying the second item of video content in a loop.

21. The method of claim 15 wherein the first item of video content is received from a first tuner of the television and wherein the second item of video content is received from a second tuner of the television.

22. The method of claim 15 wherein the remote controller device is in communication with a network, wherein the first item of video content is received from a tuner of the television and wherein the second item of video content is received from the network.

23. The method of claim 15 wherein the second item of video content and the available programming content information including the plurality of content titles are provided by an Internet on-demand video streaming service, and wherein the second item of video content is received as a video stream from the Internet on-demand video streaming service via a network.

24. The method of claim 15 wherein the second item of video content and the available programming content information including the plurality of content titles are provided by a video sharing web site configured to permit users to upload, share and view videos, and wherein the second item of video content is received as a video stream from the video sharing web site via a network.

25. A video content display system comprising:
a television; and
a remote controller device operable to control the television, the remote controller device comprising:
a remote controller display screen, wherein the remote controller display screen is a touch screen; and
a processor in communication with the remote controller display screen and configured to:
concurrently display on the remote controller display screen a first item of video content in real time, wherein an area of the remote controller display screen consisting of the display of the first item of video content is a video content display area of the remote controller display screen, metadata of the first item of video content, and available programming content information of other items of video content that can be displayed on the television and are different from the first item of video content, wherein the first item of video content is displayed while the television is concurrently displaying in real time the first item of video content,
receive a first user command for preliminarily selecting a second item of video content that is different from the first item of video content being displayed on the television, the first user command comprising the user touching only a second item area of the remote controller display screen, wherein the second item area is different from the video content display area and corresponds to the second item of video content, receive the second item of video content in response to the first user command, in response to the first user command and while the television continues to display the first item of video content, replace the first item of video content displayed on the remote controller display screen with the second item of video content, wherein the second item of video content is displayed concurrently with the available programming content of the video content that can be displayed on the television and the metadata of the first item of video content, after replacing the first item of video content displayed on the video content display area with the second item of video content in response to the first user command selecting the second item area, receive a second user command for finally selecting the second item of video content, the second user command comprising touching by the user of only the second item of video content of the video content display area of the remote controller display screen while the second item of video content is displayed on the video content display area of the remote controller display screen, and in response to the second user command transmit to the television a selection command that causes the television to display the second item of video content on the television.

\* \* \* \* \*

UNITED STATES PATENT AND TRADEMARK OFFICE
CERTIFICATE OF CORRECTION

PATENT NO. : 10,341,711 B2  
APPLICATION NO. : 13/096205  
DATED : July 2, 2019  
INVENTOR(S) : Friedlander et al.

Page 1 of 1

It is certified that error appears in the above-identified patent and that said Letters Patent is hereby corrected as shown below:

In the Claims
Claim 1, Column 11, Line 42, delete "screen:" and insert --screen;--.
Claim 7, Column 12, Line 56, delete "screen:" and insert --screen;--.
Claim 14, Column 14, Line 15, delete "screen:" and insert --screen;--.

Signed and Sealed this
Third Day of September, 2019

Andrei Iancu
*Director of the United States Patent and Trademark Office*